Oct. 25, 1932.  G. E. KARL  1,884,720
ROTARY HOE CULTIVATOR
Original Filed March 8, 1930   2 Sheets—Sheet 1
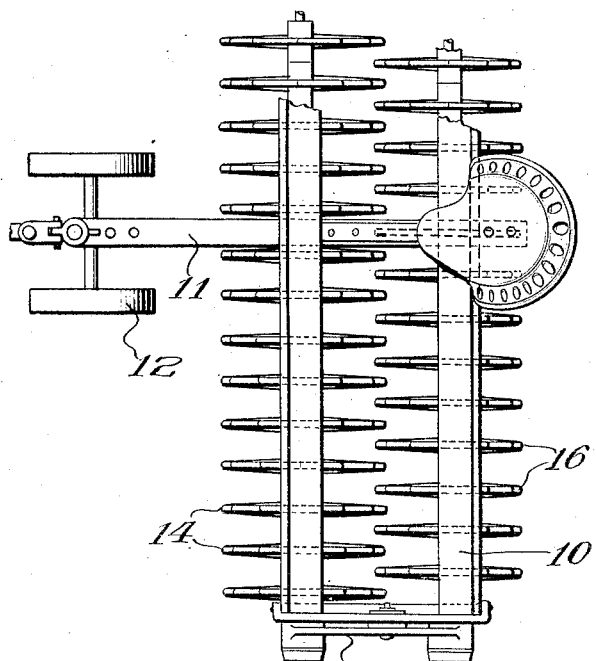
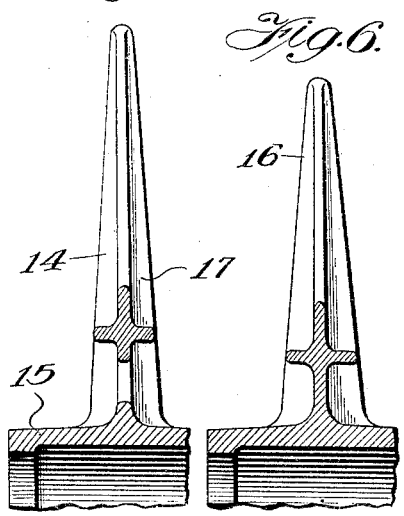
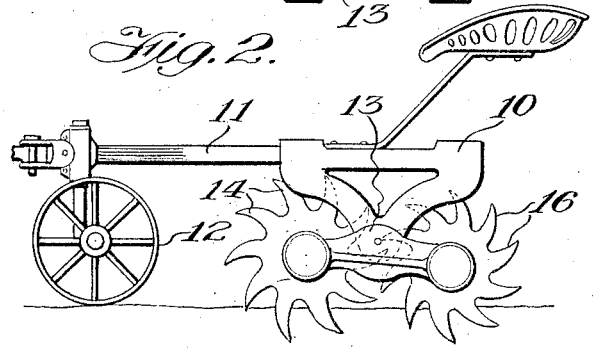
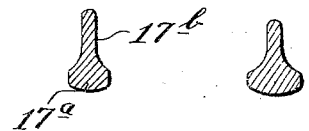
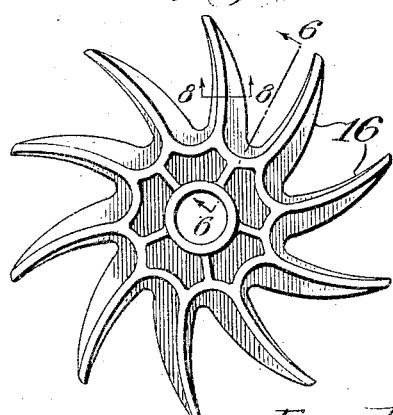
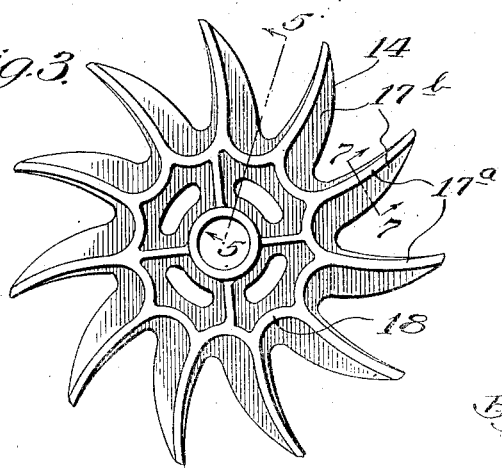
Inventor:
George E. Karl,
By Banning & Banning
Attys.

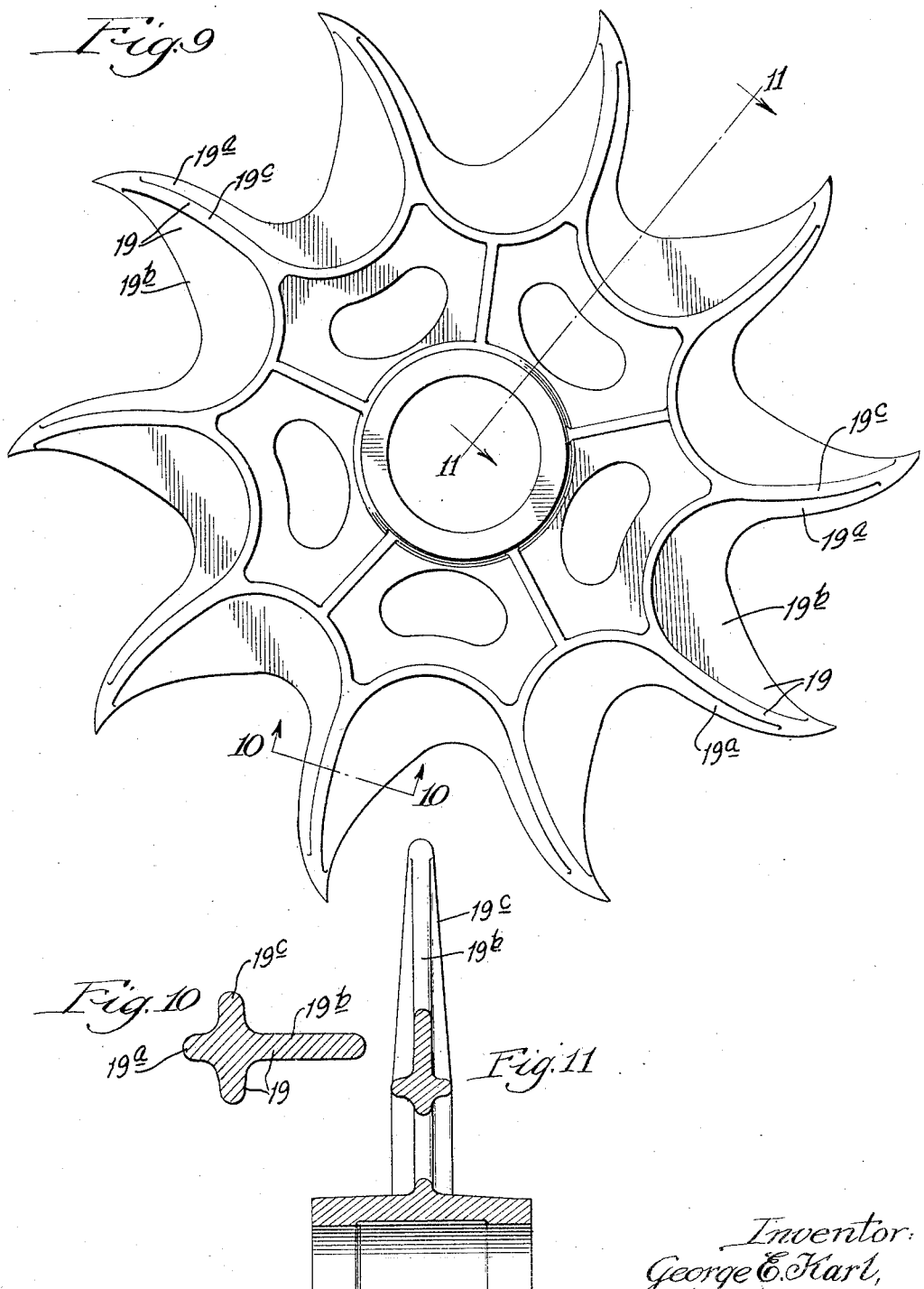

Patented Oct. 25, 1932

1,884,720

UNITED STATES PATENT OFFICE

GEORGE E. KARL, OF BEREA, OHIO, ASSIGNOR, BY MESNE ASSIGNMENTS, TO THE DUNHAM COMPANY, OF BEREA, OHIO, A CORPORATION OF OHIO

ROTARY HOE CULTIVATOR

Application filed March 8, 1930. Serial No. 434,228.

This invention relates to an improvement in cultivators of the rotary hoe type in which there is a large number of cultivator or pulverizer wheels carried upon a horizontal transversely mounted shaft or shafts, each wheel having a number of curved prongs or blades which penetrate the soil, pulverizing and lifting it as they rotate forward through it.

An object of this invention is to provide an improved rotary wheel for use in cultivators or pulverizers of this type.

Another object is to provide a wheel of this character which can be made of cast-iron instead of malleable iron as wheels of this kind are now usually made.

Another object is to provide an improved arrangement of gangs of wheels which will give a large amount of pulverizing and cultivating to the soil.

Another object is to provide an arrangement of gangs of wheels which will be self clearing, so that the implement can be operated over trashy ground.

Another object is to provide an improved form of pronged wheel which will have good soil penetrating qualities combined with lightness and strength.

Another object is to provide an improved form of prong and shoulder which will serve as a limiting stop to regulate the penetration of the prongs into the soil.

Another object is to provide a two gang implement of this character which is flexible so as to follow the contour of the ground which can be safely weighted where the soil conditions demand greater weight in order to obtain the necessary penetration.

These and other objects as will hereinafter appear are accomplished by this invention which is fully described in the following specification and shown in the accompanying drawings in which—

Figure 1 is a top plan view of a cultivator embodying the invention;

Fig. 2 is an end elevation of the same;

Fig. 3 is an enlarged detail front elevation of a wheel of the front gang;

Fig. 4 is a similar view of a modified form of wheel;

Fig. 5 is an enlarged partial section on the line 5—5 of Fig. 3;

Fig. 6 is an enlarged partial section on the line 6—6 of Fig. 4;

Fig. 7 is an enlarged section on the line 7—7 of Fig. 3;

Fig. 8 is an enlarged section on the line 8—8 of Fig. 4;

Fig. 9 is an enlarged view of still another form of wheel; and

Figs. 10 and 11 are sections on the line 10—10 and 11—11 of Fig. 9.

The embodiment illustrated comprises the cultivator made up of a weight carrying frame 10 having a tongue 11 and a forecarriage 12 mounted therein in any well known manner, the weight carrying frame 10 being flexibly mounted at each side to a shaft carrying frame 13. Shafts (not shown) are mounted at their two ends in suitable bearings in the ends of the shaft carrying frames 13. Upon the front shaft is mounted a series of wheels 14 which have hubs 15 by means of which they are spaced. Likewise a series of wheels 16 are rotatably mounted upon the rear shaft.

The front wheels 14 are provided with a series of prongs 17 for penetrating the soil, each prong having a forward face which is slightly forwardly curved to assist the prong in entering the soil. These prongs are narrowest at the tip and widest at the base, as shown in Fig. 5, and as shown in Fig. 7 each has a front face $17^a$ which is relatively wide and shallow from front to back, but having a central rib $17^b$ which, as shown, is so proportioned as to give the prong great rigidity and strength, and at the same time, adding little weight to the wheel. The back rib $17^b$ is curved at the bottom and terminates in the front face of the next succeeding prong.

The face 17ª of the prong curves forwardly and backwardly to form a series of serrations or scallops 18 which serve as depth regulators to limit the penetration of the prongs into the soil. This depth regulation is greatly increased due to the fact that these serrations or scallops are made concavely arcuate.

The rear wheels, of which one is shown in Fig. 4, are made similar to that shown in Fig. 3, but are preferably made with certain differences. While these wheels may be made alike, certain advantages are to be gained by using a different wheel which will now be described.

The front wheel being in advance necessarily has to do the first breaking of the ground, and for this purpose it is advisable to make the prongs sharper and preferably narrower than those of the rear wheels. The rear wheel, on the other hand, may be made somewhat broader and more spade-like as the soil penetrated by this wheel is well loosened by the front wheel. By using a broader prong on the rear wheel a greater pulverizing effect is obtained. The relative cross-section of these two wheels is as shown in Figs. 7 and 8. For certain soils, it is also preferable to use a somewhat smaller hoe wheel in the rear than in front.

The weight carrying frame 10 is so flexibly mounted at each end on the shaft carrying frames 13, as to throw much more weight on the front gang of wheels than on the rear gang. Any weight added to this frame is distributed between the two gangs of wheels in a predetermined proportion. Moreover, this flexible connection enables these gangs to follow the contour of the soil without undue strains being placed on the frame and without transmitting through the tongue 11 a whipping action to the forecarriage. This lack of whipping action is particularly advantageous where the implement is drawn by horses and no forecarriage is used.

By using wheels 14 and 16 of any given size and by spacing the axles just such an amount apart as to produce an overlap of not more than two prongs at one time a great advantage has been secured, resulting in the fact that these wheels are largely self clearing so that an implement of this type can be run over a field in which there is much trash without this trash becoming wound up in the wheels themselves. This is an advantage of considerable importance inasmuch as tillage wheels heretofore used and having several prongs overlapping have been unable to operate for any considerable length of time over trashy ground without this trash becoming wound up in the wheels themselves and having to be cleared therefrom.

It is also obvious that, by a proper spacing of the axles, the same results can be attained between wheels of equal or unequal size or between wheels having an equal or an unequal number of prongs or any combination thereof.

In Figs. 9 and 10 is shown a preferred form of the rotary hoe wheel having a plurality of prongs 19, each having a forward face which is forwardly curved to assist the prong in entering the soil. The rear of this prong is provided with a rib 19ª which is relatively shallow and preferably centrally located, while a deeper rib 19ᵇ connects the inner end of the rib 19ª with the forward face of the prong 19.

These two forms of central light ribs provide great stiffness to the prongs, and it has been found in actual practice that this form of hoe wheel has very superior penetrating ability due probably to the cutting action of the forward rib 19ᵇ, which thereby greatly assists the spade-like portions 19ᶜ of the prong to enter the soil.

While I have shown and described but a few embodiments of my invention, it is to be understood that it is capable of many modifications. Changes, therefore, in the construction and arrangement may be made which do not depart from the spirit and scope of the invention as disclosed in the appended claims.

I claim:

1. A one-piece rotary hoe wheel having a hub, a plurality of radially disposed prongs which are forwardly arcuately curved, said prongs having rearwardly extending central ribs.

2. A one-piece rotary hoe wheel having a hub, a plurality of radially disposed prongs which are forwardly arcuately curved, said prongs having rearwardly extending central ribs, the rib of one prong being carried into the front face of the next prong.

3. A one-piece rotary hoe wheel having a hub, a plurality of radially disposed prongs which are forwardly arcuately curved, said prongs having rearwardly extending central ribs, the rib increasing in depth from the tip to the base.

4. A rotary hoe wheel having a hub, a plurality of radially disposed prongs which are forwardly arcuately curved, said prongs having rearwardly extending central ribs, the front faces of the prongs being connected at the inner ends by concavely arcuate flanges which serve as depth regulators.

5. A rotary hoe wheel having a hub, a plurality of radially disposed prongs which are forwardly arcuately curved, said prongs having rearwardly extending central ribs, the front faces of the prongs being connected at the inner ends by concavely arcuate flanges of substantially the same width as that of the inner ends of the prongs, said flanges serving as depth regulators.

6. In an implement of the class described, a frame, front and rear shafts carried thereby, a plurality of hoe wheels on each of said shafts, the hoe wheels on the one gang having broader prongs than those of the other gang.

7. In an implement of the class described, a frame, front and rear shafts carried thereby, a plurality of hoe wheels on each of said shafts, the hoe wheels on the one gang being smaller than the hoe wheels on the other gang, the one gang having broader prongs than those of the other gang.

8. In an implement of the class described, a frame, front and rear shafts carried thereby, a plurality of hoe wheels on each of said shafts, the hoe wheels on the one shaft having more prongs, than those on the other shaft.

9. In an implement of the class described, a top frame, a side frame flexibly connected to each side of the top frame, shafts journalled at their ends in said side frames, and hoe wheels on said shafts.

10. In an implement of the class described, a top frame, a side frame flexibility connected to each side of the top frame, shafts journalled at their ends in said side frames, and hoe wheels on said shafts, said top frame being connected to said side frames nearer the front shaft than the rear shaft whereby the greater portion of the weight of the top frame is taken by the front shaft.

11. A rotary hoe wheel having a hub, a plurality of radially disposed prongs which are forwardly arcuately curved, the front faces of the prongs being connected at their inner ends by concavely arcuate flanges of substantially the same width as that of the inner ends of the prongs, said flanges serving as depth regulators, and a rib on the forward face of each prong extending to the next adjacent prong.

12. A rotary hoe wheel having a hub, a plurality of radially disposed prongs which are forwardly arcuately curved, the front faces of the prongs being connected at their inner ends by concavely arcuate flanges of substantially the same width as that of the inner ends of the prongs, said flanges serving as depth regulators, and a central rib on the forward face of each prong extending to the next adjacent prong.

13. A rotary hoe wheel having a hub, a plurality of radially disposed prongs which are forwardly arcuately curved, the front faces of the prongs being connected at their inner ends by concavely arcuate flanges of substantially the same width as that of the inner ends of the prongs, said flanges serving as depth regulators, and a relatively shallow rib on the rear face of each prong being deepest near the front base of the prong and tapering to its point.

14. A rotary hoe wheel having a hub, a plurality of radially disposed prongs which are forwardly arcuately curved, the front faces of the prongs being connected at their inner ends by concavely arcuate flanges of substantially the same width as that of the inner ends of the prongs, said flanges serving as depth regulators, and a relatively shallow rib on the rear face of each prong being deepest near the front base of the prong and arcuately tapering to its point.

In testimony whereof, I have hereunto set my hand this 29th day of December, 1929.

GEORGE E. KARL.